United States Patent [19]

Shimamune et al.

[11] Patent Number: 5,361,153
[45] Date of Patent: Nov. 1, 1994

[54] ELECTRODE PLATE AND PROCESS FOR PRODUCTION THEREOF

[75] Inventors: Masayuki Shimamune, Tokyo; Takashi Enomoto, Sagamihara; Toshifumi Yoshioka, Hadano, all of Japan

[73] Assignee: Canon Kabushiki Kaisha, Tokyo, Japan

[21] Appl. No.: 895,609

[22] Filed: Jun. 9, 1992

[30] Foreign Application Priority Data

Jun. 12, 1991 [JP] Japan .................. 3-140107

[51] Int. Cl.⁵ .......................................... G02F 1/1343
[52] U.S. Cl. ...................... 359/87; 156/659.1; 428/1; 428/650; 428/655
[58] Field of Search .................. 359/54, 55, 87; 156/652, 628, 656, 633, 659.1, 634; 428/1, 548, 569, 615, 640, 652, 650

[56] References Cited

U.S. PATENT DOCUMENTS

| | | | |
|---|---|---|---|
| 4,543,573 | 9/1985 | Fuyama et al. | 359/88 |
| 4,853,296 | 8/1989 | Fukuyoshi | 428/623 |
| 4,859,036 | 8/1989 | Yamanaka et al. | 350/336 |
| 5,150,233 | 9/1992 | Enomoto et al. | 359/87 |

FOREIGN PATENT DOCUMENTS 102351  4/1989  Japan .

Primary Examiner—William L. Sikes
Assistant Examiner—Tai V. Duong
Attorney, Agent, or Firm—Fitzpatrick, Cella, Harper & Scinto

[57] ABSTRACT

An electrode plate suitable for use in an electro-optical device, such as a liquid crystal device, is formed by successively disposing on a substrate a first layer of a transparent conductor film, a second layer of molybdenum or a molybdenum alloy, a third layer of aluminum or an aluminum alloy, and a fourth layer of molybdenum or a molybdenum alloy. The laminate electrode structure is patterned by a photolithographic process, followed by removal of the photoresist with a peeling liquid, during which the fourth molybdenum layer functions as a protective film for the third Al layer against the peeling liquid to prevent the formation of electrode defects.

13 Claims, 3 Drawing Sheets

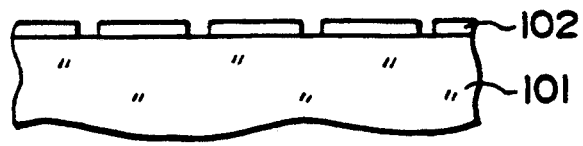
F I G. 1A
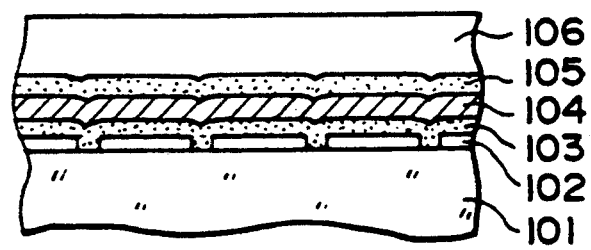
F I G. 1B
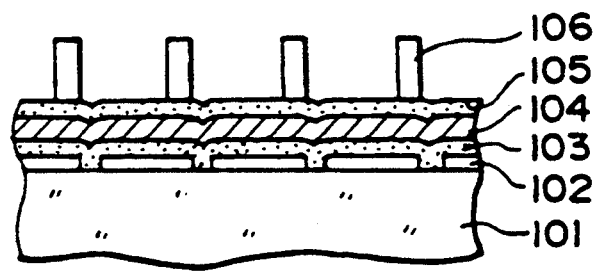
F I G. 1C
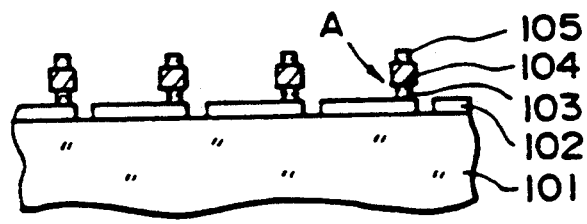
F I G. 1D

ELECTRODE PLATE AND PROCESS FOR PRODUCTION THEREOF

FIELD OF THE INVENTION AND RELATED ART

The present invention relates to an electrode plate for use in electro-optical devices, such as a liquid crystal device and an electrochromic device, used in a display device, a shutter array, etc., and a process for production thereof; particularly an electrode plate having a laminar structure of an ITO (indium tin oxide) and a metal wire for a display electrode, and a process for producing such an electrode plate.

Hitherto, it has been practiced to use a laminar structure of an ITO (indium tin oxide) electrode and a metal wire so as to provide a lower resistivity electrode structure for a liquid crystal display device. As a metal constituting such a metal wire, there has been used a metal, such as Cr (chromium), Mo (molybdenum), W (tungsten) or Ni (nickel), which can be selectively etched in combination with ITO and can also be subjected to an ordinary photolithographic process. In recent years, however, there has been an increasing demand for liquid crystal display devices having a larger area and a higher resolution, and accordingly, the electrodes are required to have a further lower resistivity. For this reason, Al (aluminum) has been recently used as a metal wire because it shows a low resistivity, is inexpensive and is suited for fine processing.

However, when a laminate electrode structure of ITO and Al is formed by an ordinary lithographic process, there has been observed a difficulty that pinhole defects are liable to occur in the ITO film. In order to obviate the difficulty, it has been proposed by us to use a display electrode of a three-layer structure wherein an Mo or Mo alloy layer is inserted between the ITO layer and the Al layer (U.S. patent application Ser. No. 7/658,501, EP-A-0444580).

In a conventional photolithographic process for forming such an electrode structure as described above, a photoresist film is formed on a film (e.g., Al film) to be patterned by etching and exposed in a prescribed pattern, followed by development to form a photoresist pattern, etching of the film to be patterned and peeling of the photoresist pattern. In the step of peeling the photoresist pattern during the photolithographic process, it has been generally practiced to use a peeling liquid containing an organic amine, such as monoethanolamine, diethanolamine, triethanolamine, methylamine, ethylamine, dimethylamine, trimethylamine and triethylamine. After removing the photoresist pattern by using such a peeling liquid, the substrate is washed with water or pure water. In the washing step, there has been observed a difficulty that the organic amine used in the previous step reacts with water to provide an alkalinity by which the Al film is etched. It has been also observed that the photoresist pattern remains attached at the metal wire part.

SUMMARY OF THE INVENTION

An object of the present invention is to provide an electrode plate and a process for production thereof having solved the above-mentioned difficulties.

Another object of the present invention is to provide an electrode plate suitable for use in a large-area electro-optical device, such as an electrochromic device or a liquid crystal device.

According to an aspect of the present invention, there is provided an electrode plate, comprising: a substrate, and a first layer of a transparent conductor film, a second layer of molybdenum or a molybdenum alloy, a third layer of aluminum or an aluminum alloy, and a fourth layer of molybdenum or a molybdenum alloy disposed in the named order on the substrate.

According to another aspect of the present invention, there is provided a process for producing an electrode plate, comprising the steps of:

(a) forming a transparent conductor film on a transparent substrate, (b) patterning the transparent conductor film, (c) coating the patterned transparent conductor film on the transparent substrate successively with a first layer of molybdenum or a molybdenum alloy, a second layer of aluminum or an aluminum alloy, a third layer of molybdenum or a molybdenum alloy, and a photoresist film, (d) exposing the photoresist film in a pattern and developing the exposed photoresist film to form a patterned photoresist film, (e) etching the first to third layers through the patterned photoresist film, and (f) removing the patterned photoresist film with a peeling agent, followed by washing with water.

These and other objects, features and advantages of the present invention will become more apparent upon a consideration of the following description of the preferred embodiments of the present invention taken in conjunction with the accompanying drawings.

BRIEF DESCRIPTION OF THE DRAWINGS

FIGS. 1A–1D illustrate a process for forming a first embodiment of the electrode plate according to the invention.

DESCRIPTION OF THE PREFERRED EMBODIMENTS

Figure 2A:
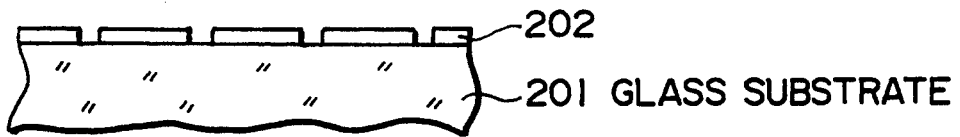
FIGS. 2A–2E illustrate a process for forming a second embodiment of the electrode plate according to the invention.
Figure 2B:
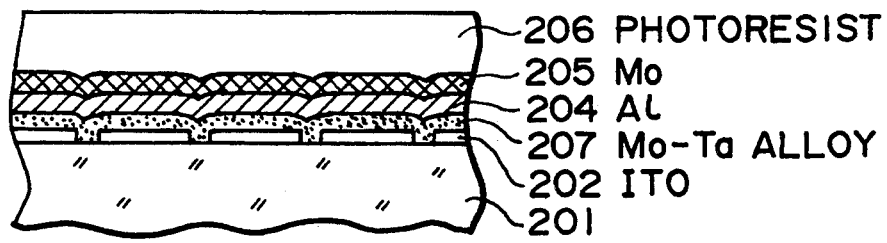
Figure 2C:
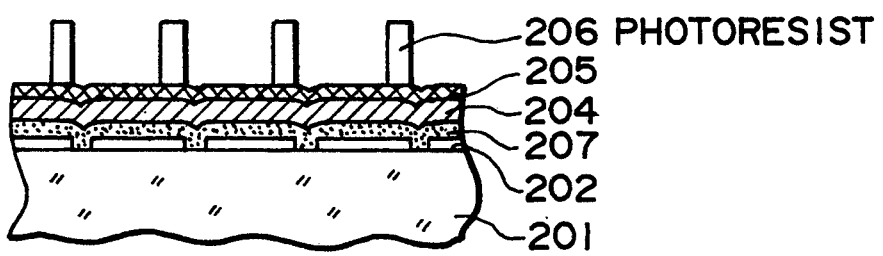
Figure 2D:
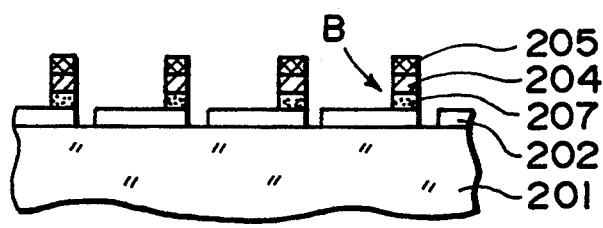

FIGS. 1A–1D illustrate a process for producing an embodiment of the electrode plate which may be suitably used in a liquid crystal display device or an electrochromic device. Referring to the figures, a glass substrate 101 was first coated with a 1000 Å-thick first layer of ITO 102 by sputtering, which layer was patterned into stripes by an ordinary photolithographic process (FIG. 1A). Then, a laminated film structure including a 500 Å-thick Mo layer 103, a 3000 Å-thick Al layer 104 and a 500 Å-thick Mo layer 105 was further formed thereon similarly by successive sputtering steps. Further thereon, a layer 106 of a positive photoresist principally comprising ethylcellosolve acetate (trade name: "OPFR-800", available from Tokyo Ohka K.K.) was formed in a thickness of about 1 μm by application using a roller coater (FIG. 1B). The photoresist layer 106 was exposed in a prescribed pattern and dipped in a developer liquid comprising an organic alkali (e.g., ammonia solution) (trade name: "NMD-3", available from Tokyo Ohka K.K.) to be developed into a pattern (FIG. 1C). Then, through the photoresist pattern 106, the Mo and Al layers 103-105 were etched by an etching liquid comprising a mixture of phosphoric acid/nitric acid/acetic acid/water in volumetric ratios of 16:1:2:1, and then the photoresist pattern 106 was peeled by using a peeling liquid comprising principally monoethanolamine (trade name: "N-303C", available from Nagase K.K.) to leave a laminate metal electrode pattern (FIG. 1D). In this instance, the Mo film 105 functioned as a protective film for the Al film 104 against the peeling liquid so that the peeling of the photoresist pattern 106 was performed by using sufficient time.

The peeling liquid used for the above purpose may generally comprise an organic amine selected from those described above, and the organic amine may be used in the form of a solution in an appropriate solvent, such as ethanol and propanol.

FIGS. 2A-2E illustrate a process for producing a second embodiment of the electrode plate which may suitably be used in a liquid crystal device or an electrochromic device. This embodiment is characterized by the use of an Mo—Ta alloy for the second layer compared with the first embodiment discussed above. Referring to the figures, a glass substrate 201 was coated with a pattern of ITO electrodes 202 (FIG. 2A), and coated successively with a 500 Å-thick layer 207 of Mo—Ta alloy (Mo 90 wt. %, Ta 10 wt. %), a 3000 Å-thick Al layer 204 and a 500 Å-thick Mo layer to form a laminate metal structure, which was then etched into a metal electrode pattern (FIGS. 2B-2D) in a similar process as explained in the previous embodiment.

Figure 2E:
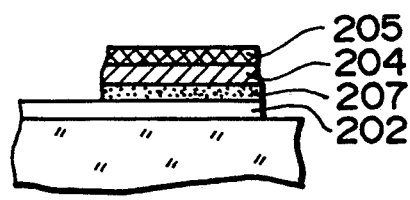
Figure 4:
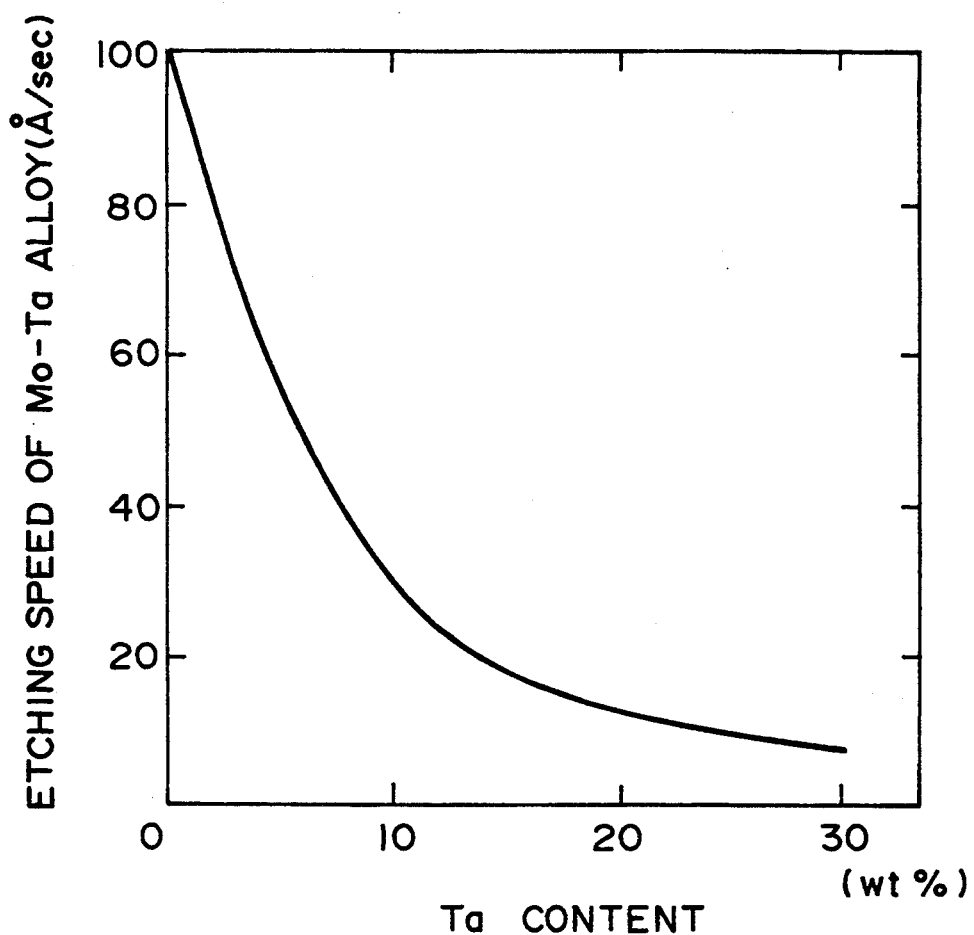
FIG. 4 is a graph showing a relationship between the etching speed of Mo–Ta alloy and the Ta content in the alloy.

It has been confirmed that Mo—Ta alloys can have varying etching speeds depending on the Ta content as shown in FIG. 4, so that the etching speed can be varied by adjusting the Ta content. In this embodiment, the Mo—Ta alloy containing 10 wt. % of Ta was used to provide an etching speed which was smaller than that of Al. As a result, an etching speed relationship of Mo>Al>Mo—Ta alloy was satisfied to provide an ideal laminated electrode pattern including a narrower upper layer and a broader lower layer (FIG. 2E).

A pair of the thus-prepared electrode plates were respectively subjected to an aligning treatment and applied to each other to form a blank cell, which was then filled with a ferroelectric liquid crystal (trade name: "CS-1014", available from Chisso K.K.) to provide a liquid crystal display device. The display device was found to show a good display state with no aligning defects in the vicinity of the electrodes.

In the above-described embodiments, metal wires (or electrodes) of Al were used. It is however possible to also use a metal wire of an Al alloy, such as Al—Si, Al—Si—Cu or Al—Ti, in view of electro-migration characteristic or anti-corrosion characteristic. In such cases, it is also possible to control the etching speed of an Mo alloy, such as Mo—Ta or Mo—Ti, by adjusting the Ta or Ti content, to find an appropriate etching speed suitable for use in combination with such an Al alloy.

The above effects have been confirmed with respect to all types of liquid crystal devices including those of the STN-type, active matrix-type and ferroelectric liquid crystal-type.

Figure 3:
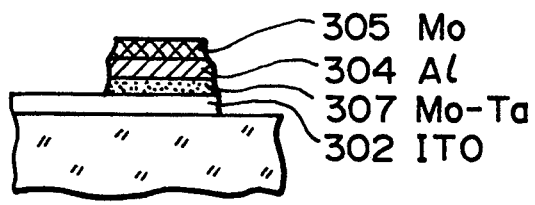
FIG. 3 is a sectional view of a third embodiment of the electrode plate according to the invention.

FIG. 3 is a sectional view showing another embodiment of the electrode plate according to the present invention. The electrode plate includes a glass substrate and a laminated display electrode structure including an ITO layer 302, an Mo—Ta alloy layer, an Al layer 304 nd an Mo layer 305. The electrode plate was prepared in the same manner as in the second embodiment described above except that an Mo—Ta alloy having a Ta content of 7.5 wt. % was used for the layer 307 so as to provide an etching speed substantially identical to that of the Al layer 304. As a result, the resultant laminated structure had a structure as shown in FIG. 3 including a vertical side wall including the Mo—Ta layer 307 and the Al layer 304, which was different from a so-called pyramid shape having a tapered side wall as in the previous embodiment.

A pair of the thus-prepared electrode plates were also found to provide a ferroelectric liquid crystal display device giving a good display with no liquid crystal alignment defects in the vicinity of the display electrodes.

Generally, the Mo—Ta alloy may suitably have a Ta content of at most 30 wt. %, preferably 5-15 wt. %. The Mo—Ti alloy may suitably have a Ti content of at most 30 wt. %, preferably 5-15 wt. %. Further, each of the two layers of Mo or Mo alloy may suitably have a thickeners in the range of 50 Å-2000 Å.

Suitable examples of the liquid crystal material other than the one described above may include those chiral smectic liquid crystals disposed in, e.g., U.S. Pat. Nos. 4,918,213, 4,979,805, 4,999,130, 5,034,151, 5,034,152, 5,073,306, 5,075,030, 5,075,031, and 5,076,961.

Further, the electrode plate according to the present invention may suitably be used in substitution for electrode plates used in chiral smectic liquid crystal devices as disclosed in, e.g., U.S. Pat. Nos. 4,674,839, 4,682,758, 4,709,934, 4,712,873, 4,712,875, 4,720,173, 4,728,176, 4,740,060, 4,744,639, 4,763,995, 4,773,738, 4,775,225, 4,859,036, 4,878,740, 4,932,757, 5,000,545, 5,005,953, 5,007,716, 5,035,491, 5,054,890, and 5,078,475.

As described above, according to the present invention, there is provided an electrode plate having laminated display electrodes including a first layer of ITO, a second layer of Mo or an Mo alloy, a third layer of Al or an Al alloy and a fourth layer of Mo or an Mo alloy which can be formed without complicating the production process, particularly the photoresist-removing step therein, to provide an electrode pattern and thus a liquid crystal device showing a good display state free from liquid crystal alignment defects in the vicinity of the electrodes.

What is claimed is:

1. An electrode plate, comprising: a substrate, and a first layer of a transparent conductor film, a second layer of molybdenum or a molybdenum alloy, a third layer of aluminum or an aluminum alloy, and a fourth layer of molybdenum or a molybdenum alloy disposed in the named order on the substrate.

2. An electrode plate according to claim 1, wherein said molybdenum alloy of the second layer comprises a molybdenum-tantalum alloy.

3. An electrode plate according to claim 1, wherein said molybdenum alloy of the second layer comprises a molybdenum-titanium alloy.

4. An electrode plate according to claim 1, wherein said molybdenum alloy of the fourth layer comprises a molybdenum-tantalum alloy.

5. An electrode plate according to claim 1, wherein said molybdenum alloy of the fourth layer comprises a molybdenum-titanium alloy.

6. An electrode plate according to claim 2 or 4, wherein said molybdenum-tantalum alloy has a tantalum content of at most 30 wt. %.

7. An electrode plate according to claim 3 or 5, wherein said molybdenum-titanium alloy has a titanium content of at most 30 wt. %.

8. An electrode plate according to claim 1, wherein the second layer has a thickness of 50–2000 Å.

9. An electrode plate according to claim 1, wherein the fourth layer has a thickness of 50–2000 Å.

10. An electro-optical device, including an electrode plate according to claim 1.

11. A liquid crystal device, including an electrode plate according to claim 1.

12. A process for producing an electrode plate, comprising the steps of:
   (a) forming a transparent conductor film on a transparent substrate,
   (b) patterning the transparent conductor film,
   (c) coating the patterned transparent conductor film on the transparent substrate successively with a first layer of molybdenum or a molybdenum alloy, a second layer of aluminum or an aluminum alloy, a third layer of molybdenum or a molybdenum alloy, and a photoresist film,
   (d) exposing the photoresist film in a pattern and developing the exposed photoresist film to form a patterned photoresist film,
   (e) etching the first to third layers through the patterned photoresist film, and
   (f) removing the patterned photoresist film with a peeling agent, followed by washing with water.

13. A process according to claim 12, wherein the peeling agent comprises a solution containing an organic amine compound as a principal constituent.

* * * * *

UNITED STATES PATENT AND TRADEMARK OFFICE
CERTIFICATE OF CORRECTION

PATENT NO. : 5,361,153

DATED : November 1, 1994

INVENTORS : MASAYUKI SHIMAMUNE ET AL.

It is certified that error appears in the above-identified patent and that said Letters Patent is hereby corrected as shown below:

ON THE TITLE PAGE

At [56] References Cited

Under "U.S. PATENT DOCUMENTS" insert

```
--4,674,839   6/1987   Tsuboyama et al.
  4,682,758   7/1987   Scobie et al.
  4,709,934  12/1987   Suzuki et al.
  4,712,873  12/1987   Kanbe et al.
  4,712,875  12/1987   Tsuboyama et al.
  4,720,173   1/1988   Okada et al.
  4,728,176   3/1988   Tsuboyama et al.
  4,740,060   4/1988   Komura et al.
  4,744,639   5/1988   Tsuboyama et al.
  4,763,995   8/1988   Katagiri et al.
  4,773,738   9/1988   Hayakawa et al.
  4,775,225  10/1988   Tsuboyama et al.
  4,859,036   8/1989   Yamanaka et al.
  4,878,740  11/1989   Inaba et al.
  4,918,213   4/1990   Nohira et al.
  4,932,757   6/1990   Hanyu et al.
  4,979,805  12/1990   Yoshinaga et al.
  4,999,130   3/1991   Nohira et al.
  5,000,545   3/1991   Yoshioka et al.
  5,005,953   4/1991   Kawagishi
```

UNITED STATES PATENT AND TRADEMARK OFFICE
CERTIFICATE OF CORRECTION

PATENT NO. : 5,361,153

DATED : November 1, 1994

INVENTORS : MASAYUKI SHIMAMUNE ET AL.

It is certified that error appears in the above-identified patent and that said Letters Patent is hereby corrected as shown below:

ON THE TITLE PAGE (continued)

At [56] References Cited

Under "U.S. PATENT DOCUMENTS" insert 5,007,716  4/1991 Hany et al.
 5,034,151  7/1991 Shinjo et al.
 5,034,152  7/1991 Katagiri et al.
 5,035,491  7/1991 Kawagishi et al.
 5,054,890 10/1991 Hanyu et al.
 5,073,306 12/1991 Nohira et al.
 5,075,030 12/1991 Togano et al.
 5,075,031 12/1991 Nohira et al.
 5,076,961 12/1991 Nakamura et al.
 5,078,475  1/1992 Sekimura et al. --.

Under "FOREIGN PATENT DOCUMENTS" insert

--0,444,580 9/1991 European Pat. Off.--.

UNITED STATES PATENT AND TRADEMARK OFFICE
CERTIFICATE OF CORRECTION

PATENT NO. : 5,361,153

DATED : November 1, 1994

INVENTORS : MASAYUKI SHIMAMUNE ET AL.

It is certified that error appears in the above-identified patent and that said Letters Patent is hereby corrected as shown below:

COLUMN 4

Line 3, "nd" should read --and--.
Line 24, "eners" should read --ness--.

Signed and Sealed this

Ninth Day of May, 1995

Attest:

BRUCE LEHMAN

Attesting Officer    Commissioner of Patents and Trademarks